US010405658B2

(12) United States Patent
McCrate

(10) Patent No.: US 10,405,658 B2
(45) Date of Patent: Sep. 10, 2019

(54) AUXILIARY BRACKET FOR ELECTRONIC DISPLAY

(71) Applicant: Mark Patrick McCrate, Dayton, OH (US)

(72) Inventor: Mark Patrick McCrate, Dayton, OH (US)

(73) Assignee: Mark McCrate, Dayton, OH (US)

( * ) Notice: Subject to any disclaimer, the term of this patent is extended or adjusted under 35 U.S.C. 154(b) by 126 days.

(21) Appl. No.: 15/530,679

(22) Filed: Nov. 9, 2015

(65) Prior Publication Data

US 2018/0014645 A1    Jan. 18, 2018

Related U.S. Application Data

(60) Provisional application No. 62/076,811, filed on Nov. 7, 2014.

(51) Int. Cl.
| | |
|---|---|
| *A47F 5/00* | (2006.01) |
| *A47F 7/00* | (2006.01) |
| *A47B 97/00* | (2006.01) |
| *F16M 13/02* | (2006.01) |
| *G06F 1/16* | (2006.01) |
| *F16M 11/04* | (2006.01) |
| *F16M 13/00* | (2006.01) |
| *A47F 5/10* | (2006.01) |

(52) U.S. Cl.
CPC ............ *A47B 97/00* (2013.01); *F16M 11/041* (2013.01); *F16M 13/00* (2013.01); *F16M 13/022* (2013.01); *G06F 1/1616* (2013.01); *G06F 1/1647* (2013.01); *G06F 1/1654* (2013.01); *A47B 2097/005* (2013.01); *A47F 5/101* (2013.01); *A47F 7/00* (2013.01)

(58) Field of Classification Search
CPC ..... F16M 13/022; G06F 1/1647; G06F 1/162; A47B 97/00; A47B 2097/005; A47F 5/101; A47F 5/10; A47F 7/00
USPC ...... 248/917, 441.1, 165, 200.1, 309.1, 919, 248/920, 225.11, 235, 466; 361/681, 361/679.27, 679.25, 679.05, 679.01, 361/679.55
See application file for complete search history.

(56) References Cited

U.S. PATENT DOCUMENTS

| | | | | |
|---|---|---|---|---|
| 3,216,580 A | * | 11/1965 | Fricker, Jr. ........... | H05K 7/1417 211/41.17 |
| 3,567,998 A | * | 3/1971 | Ammerman ............. | H02B 1/00 361/752 |
| 4,144,664 A | * | 3/1979 | De Korte ............ | G09F 15/0056 40/609 |
| 4,192,478 A | * | 3/1980 | Coules ................. | F16M 11/041 174/138 D |
| 4,830,318 A | * | 5/1989 | O'Brien ................ | A47F 5/0815 248/165 |
| D415,124 S | * | 10/1999 | Rooyakkers ................. | D14/306 |

(Continued)

*Primary Examiner* — Tan Le

(57) ABSTRACT

Disclosed is an auxiliary display bracket system comprising two brackets, each bracket comprising a lower section having a laptop shelf, an upper section having an auxiliary shelf, the upper section an opening disposed between the upper surface and lower surface, and a tension member, the tension member secured to each bracket through the opening between the upper surface and lower surface. In certain embodiments, the auxiliary display bracket allows for an auxiliary display to be disposed on a laptop monitor.

16 Claims, 8 Drawing Sheets

(56) References Cited

U.S. PATENT DOCUMENTS

| | | | | |
|---|---|---|---|---|
| 6,178,624 B1* | 1/2001 | Magette | ............... | H05K 7/1431 |
| | | | | 29/832 |
| 6,842,338 B2* | 1/2005 | Iredale | ................. | G06F 1/1616 |
| | | | | 248/551 |
| 7,724,511 B2* | 5/2010 | Jacobs | ................. | G06F 1/1681 |
| | | | | 361/679.05 |
| 9,348,367 B1* | 5/2016 | Kyle, II | ................ | H04W 4/008 |
| 2004/0228077 A1* | 11/2004 | Hall | ...................... | G06F 1/1601 |
| | | | | 361/679.25 |
| 2006/0231714 A1* | 10/2006 | Crain | .................... | G01C 15/00 |
| | | | | 248/309.1 |
| 2010/0192505 A1* | 8/2010 | Schaefer | ................ | A47B 96/14 |
| | | | | 52/653.2 |
| 2012/0037771 A1* | 2/2012 | Kitchen | ................ | G06F 1/1632 |
| | | | | 248/223.41 |
| 2018/0014645 A1* | 1/2018 | McCrate | ................ | A47B 97/00 |

* cited by examiner

AUXILIARY BRACKET FOR ELECTRONIC DISPLAY

PRIORITY CLAIM

This application claims the benefit of U.S. Provisional Application 62/076,811 filed on Nov. 7, 2014. This application is incorporated herein by reference.

BACKGROUND

Present portable computing auxiliary displays do not adequately address all portability requirements. Embodiments of the disclosed bracket provide numerous advantages over existing monitor brackets. Specifically, certain embodiments of the brackets described herein are small and can mount on existing laptop displays. While many dual and multi display arrangement are sold for desktop computers, the same cannot be said for portable computers and other devices such as tablets. Current solutions for extra displays are usually to position them to the left side, right side, or both of a main display. Typically, these extra displays incorporate large bases and brackets or hinges making it difficult or impossible to arrange them in tight spaces or in an over-under fashion. For portable applications having large support structures is not practical; and these large arrangements require a lot of desk space, which is equally not desired. Embodiments of the described bracket address many of the current shortcomings.

BRIEF SUMMARY

Disclosed is a bracket system that enables users to place an auxiliary display on a laptop monitor. Various embodiments are disclosed. In each embodiment, the placement of an auxiliary display is temporary and can be easily removed.

FIGURES

DETAILED DESCRIPTION

Figure 1:
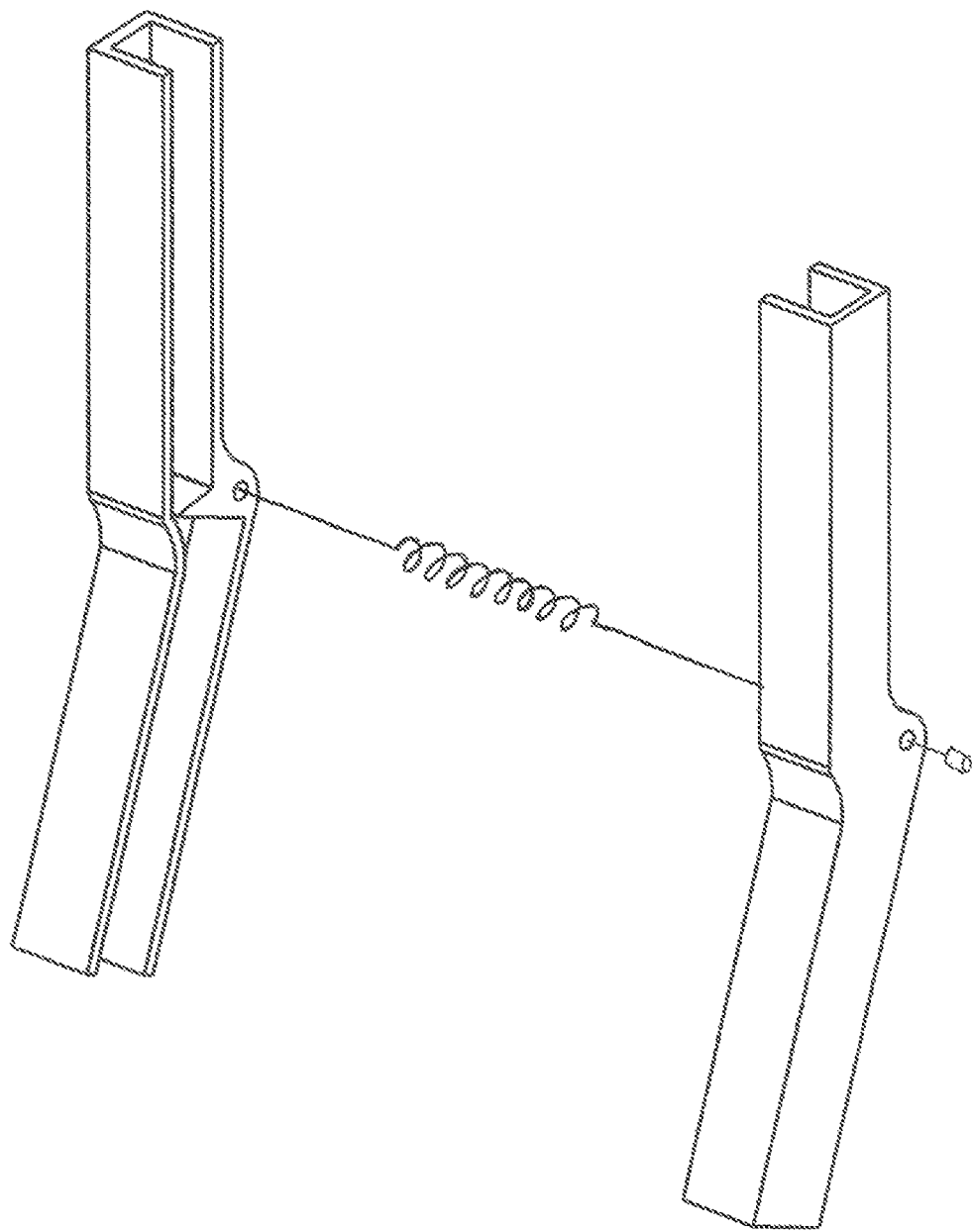
FIG. 1 illustrates an isometric type view of an embodiment of a whole bracketing system.

Disclosed, is a bracket system wherein multiple auxiliary displays can be supported above, or to the side, of computer monitor. FIG. 1 illustrates a representative embodiment of a two piece bracket system. Current auxiliary display solutions fail to meet the requirements of portability, for example they are not sturdy and fail to preserve the small surface area usually required in portable applications. The included figures illustrate various configurations that are both sturdy and mount on/in existing laptops therefore maintaining the desired/required compact surface area. As illustrated, one way to achieve this result is to fix a tension member 72, shown in FIG. 5, onto brackets 24 then expand the until brackets 24 can be secured to primary display 22, shown in FIG. 2. After the brackets are in place auxiliary display 26 can be inserted into the grooves or other features designed to hold it in place. In certain embodiments, depending on the auxiliary display model, power lines can be routed through button/wiring opening 54, shown in FIG. 3.

Figure 2:
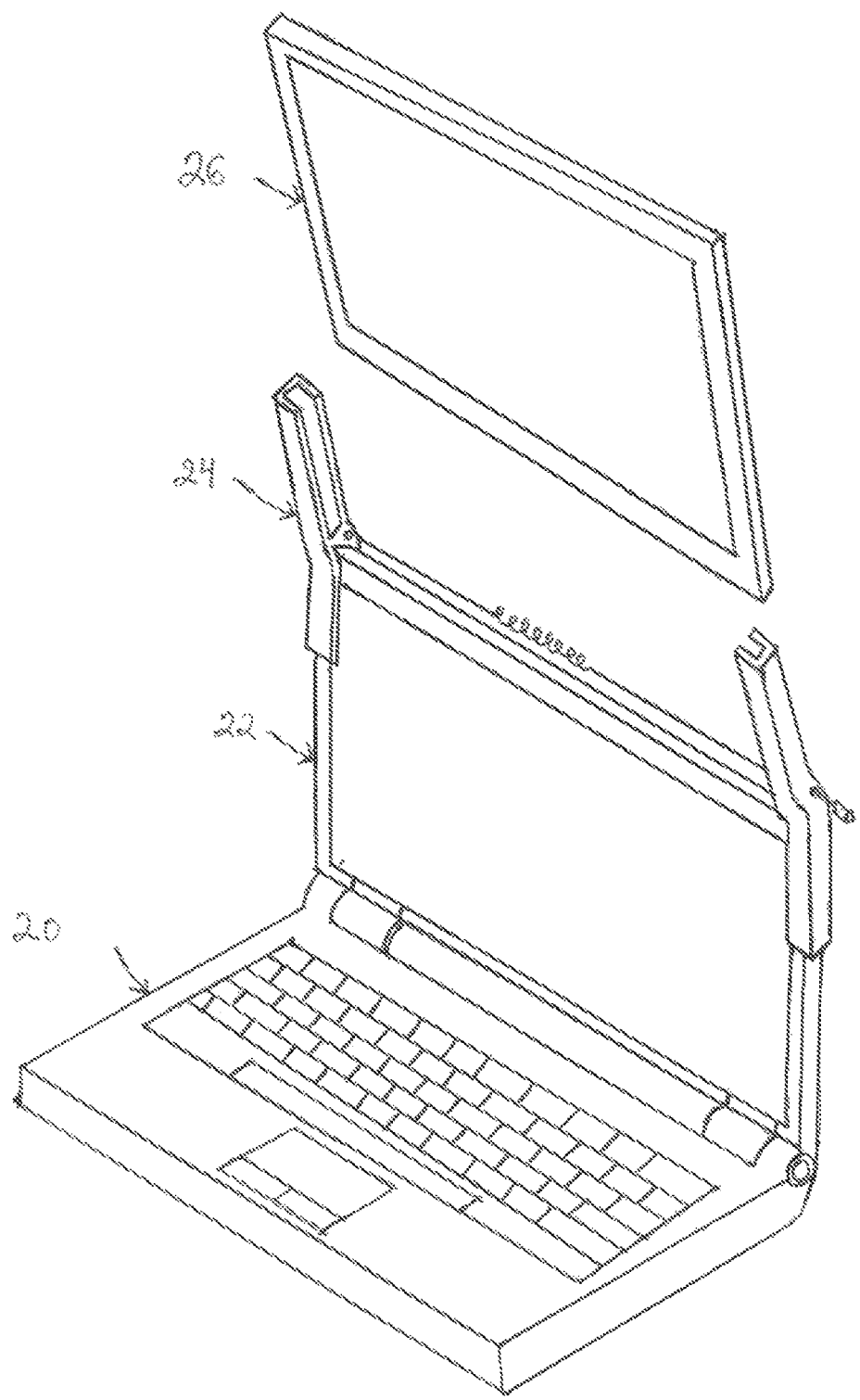
FIG. 2 illustrates a representative embodiment of a bracket disposed on a monitor of a laptop computer wherein a second monitor is to be supported by the bracket.

FIG. 2 illustrates an embodiment of a layout wherein a computer 20 is placed in front of a user. The computer, which is represented here as a laptop, has a primary display 22. To facilitate using multiple displays, without increasing the surface area occupied by a laptop, small brackets 24 are installed approximately where shown. These brackets can also be integrated into the structure as a factory delivered feature. Once brackets 24 are installed auxiliary display 26 can be placed and supported by computer 20. Auxiliary display 26 can be oriented toward a user or in any other direction.

Figure 3:
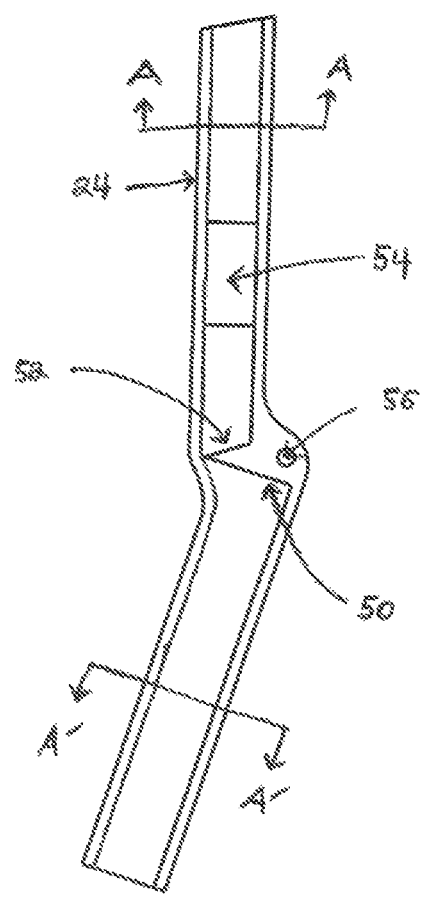
FIG. 3 illustrates a side view of a representative embodiment of a bracket.
Figure 4:
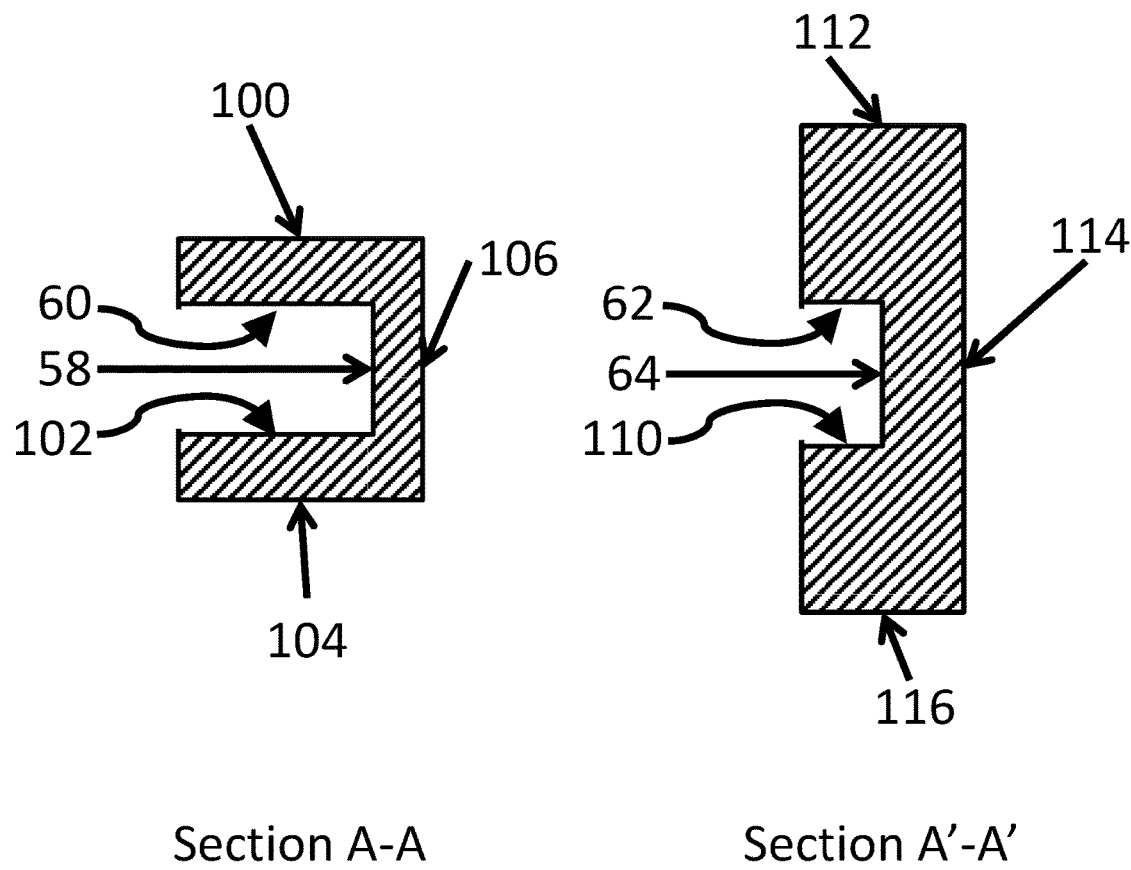
FIG. 4 illustrates a representative embodiment of a symmetric c-type channel.

FIG. 3 illustrates a side view of an embodiment of bracket 24 showing more detail. In certain embodiments, each bracket comprises an upper section, which supports an auxiliary display, and a lower section, which is disposed on a laptop monitor. Laptop shelf 50 interfaces with the laptop to support both the brackets and the auxiliary display(s). In this embodiment gravity is the main force to counter. Similarly an auxiliary shelf 52 supports an auxiliary display. In certain embodiments, button/wire opening 54, between an inner surface 58 and outer surface 106 shown in FIG. 4 provides access to power ports, data lines, buttons or any other features that can be adjusted on the auxiliary display. In certain embodiments a tension interface opening 56 is disposed through the bracket either from an upper side wall inner surface 58 to an upper side wall outer surface 106 or from a lower side wall inner surface 64 to a lower side wall outer surface 114, to provide a place to interface a tension member shown in FIG. 5. The tension member provides, at a minimum, lateral stability to the whole assembly.

Since displays are often symmetric, a c-type channel is sometimes sufficient for securing auxiliary displays to the main display. An embodiment of such a channel is illustrated in FIG. 4.

In certain embodiments, an upper side wall inner surface 58 provides lateral support (side to side support) for auxiliary displays. An upper rear wall inner surface 60 provides support that keeps the auxiliary displays from falling backward. An upper front wall inner surface 102 provides support that keeps an auxiliary display from falling forward. Working together, the upper rear wall inner surface 60 and the upper front wall inner surface 102 provide auxiliary display longitudinal (front to back support) support. Together, the upper side wall inner surface 58, upper rear wall inner surface 60, and the upper front wall inner surface 102 hold the auxiliary display or other objects securely. An upper rear wall outer surface 100, an upper front wall outer surface 104, and an upper side wall outer surface 106 are some distance from the upper rear wall inner surface 60, the upper front wall inner surface 102, and the upper side wall inner surface 58, respectively, leaving space for enough material to ensure adequate bracket strength.

Similarly, in certain embodiments, a lower side wall inner surface 64 provides lateral support (side to side support) for auxiliary displays. A lower rear wall inner surface 62 provides support to keep the auxiliary display and bracket assembly from falling backward. A lower front wall inner surface 110 provides support that keeps the auxiliary display and bracket assembly from falling forward. Working together the lower rear wall inner surface 62 and the lower front wall inner surface 110 provide longitudinal support (front to back). Together the lower front wall inner surface 62, the lower side wall inner surface 64, and the lower front wall inner surface 110 provide support derived from their contact with the primary display to hold an auxiliary display and bracket assembly or other objects securely. A lower rear wall outer surface 112, a lower side wall outer surface 114 and lower front wall outer surface 116 are some distance from the lower front wall inner surface 62, the lower side wall inner surface 64, and the lower front wall inner surface 110, respectively, leaving space for enough material to ensure adequate bracket strength.

The profiles of the upper and lower portion of the bracket can vary to match any auxiliary display and primary display. Also the dimensions of the walls are completely independent allowing for many display to display combinations and permutations.

Figure 5:
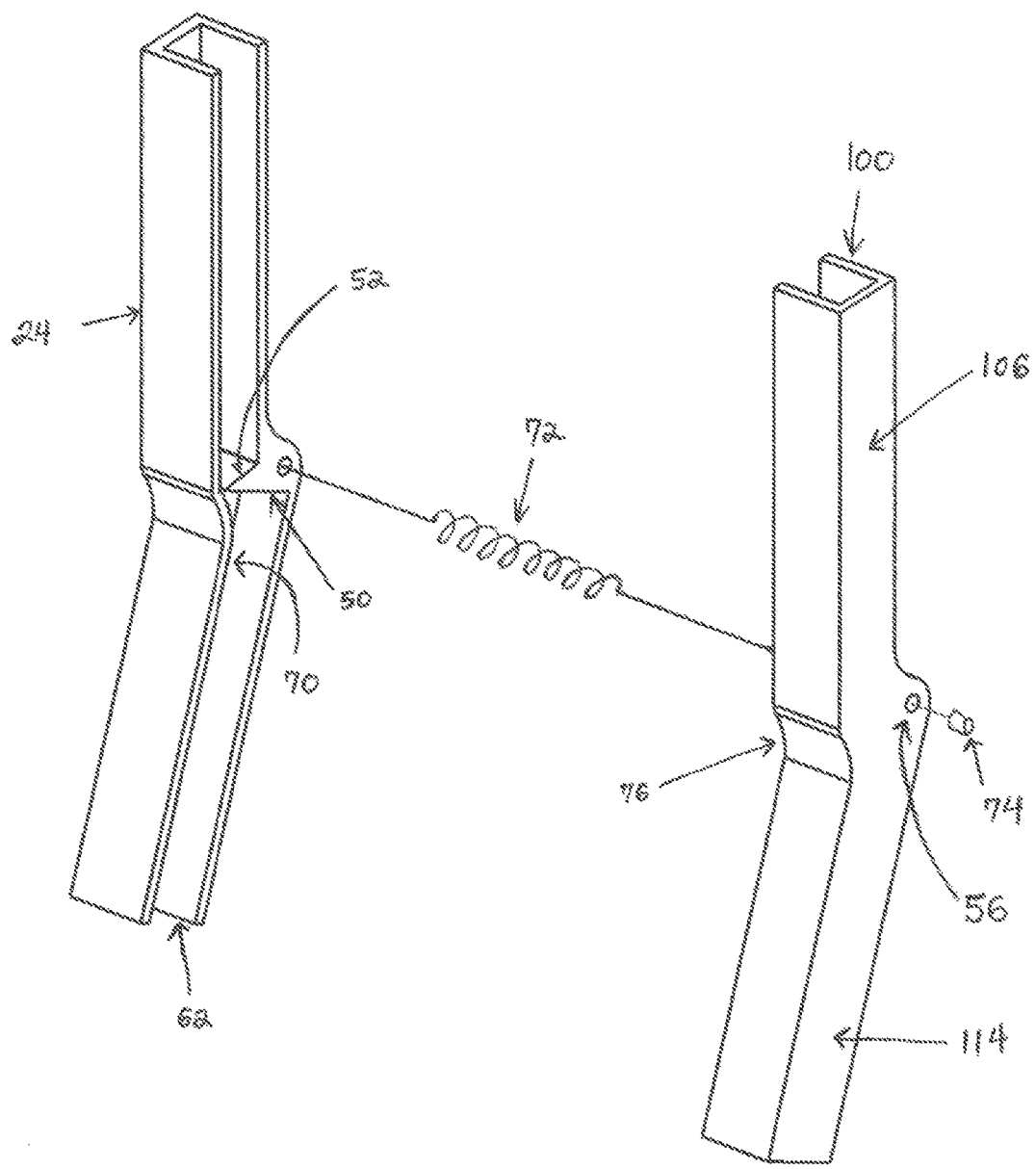
FIG. 5 illustrates a detailed embodiment of the bracket system shown in FIG. 1.

FIG. 5 illustrates an embodiment having one or more brackets 24 that are asymmetric however the system can be composed of one or more brackets that can be symmetric. The previously described laptop shelf 50, auxiliary display shelf 52, tension interface opening 56, upper rear wall outer surface 100, upper side wall outer surface 106, lower rear wall inner surface 62 and lower side wall outer surface 114 are illustrated in FIG. 3 and FIG. 4. Illustrated in FIG. 5 is a profile curve 70 that can match the contour of a laptop to provide a snug secure fit. In certain embodiments, tension member 72 can be inserted through tension interface opening 56 to provide a clamping force to hold the brackets and auxiliary display in place. A stop 74 locks onto tension member 72. Any tension transmitting material can be used as a tension member such as rope, cable, string, wire, or other suitable material. In certain embodiments, an angle 76 is designed at 15°, relative to the upper section and lower section, to provide a natural viewing angle, to keep the torque low where common laptop friction hinges can operate as designed, and to ensure the center of gravity remains inside the small portable computer surface area. There is a large tolerance on the 15° angle.

Figure 6:
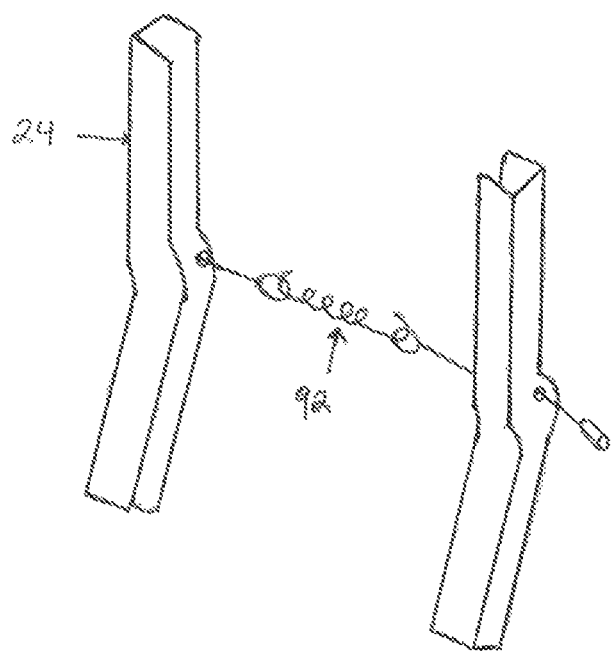
FIG. 6 illustrates an alternative embodiment of the bracket system illustrated in FIG. 1.

An additional embodiment is illustrated in FIG. 6. Brackets 24 can be secured to laptop displays via friction, magnets or a plethora of other options. In one embodiment a separable tension member 92 can be removed from the assembly. This is one example of how a multi-piece assembly can be designed. Certain embodiments comprise stand-alone pieces allow for interchanging parts that can be matched to various screen widths much like the wall profiles illustrated in FIG. 4.

Figure 7:
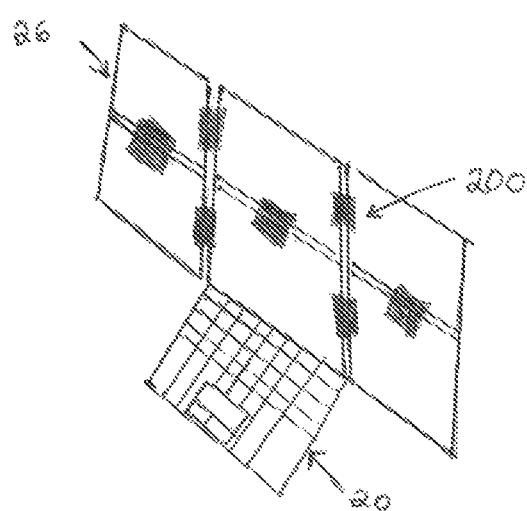
FIG. 7 illustrates an embodiment wherein a bracket system is used to support multiple auxiliary displays.

In certain embodiments, multiple auxiliary displays can be supported with bracket systems. FIG. 7 illustrates an embodiment wherein the how a bracketing system can be extended to one or more auxiliary displays in portable or desktop configurations. Here a computer 20 supports auxiliary displays 26 in concert with matrix brackets 200 that are designed accordingly. In alternate embodiments, brackets can also hold other items such as, but not limited to, books and sheet music, either alone, or in combination with other items.

Figure 8:
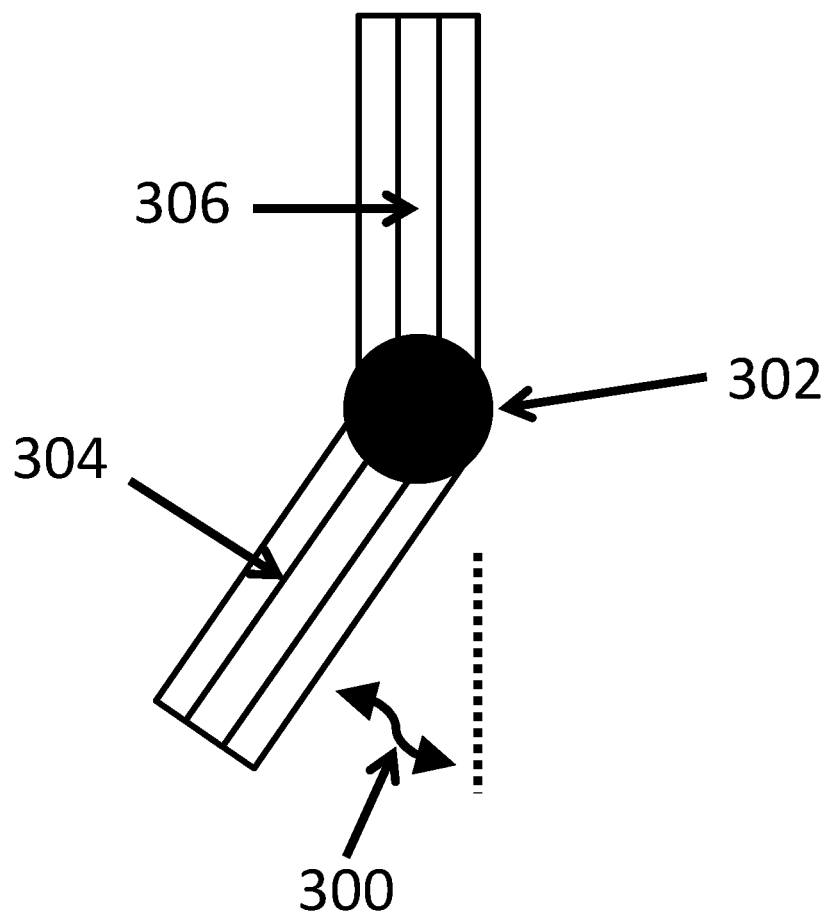
FIG. 8 illustrates an embodiment of a bracket having a hinge.

FIG. 8 Certain embodiments include one or more upper sliding features 306, one or more lower sliding features 304 and a hinge 302, as illustrated in FIG. 8. Unlike rigid brackets these features provide degrees of adjustability, a hinge 302 allows an angle 300 to differ from the previously mentioned 15°. In certain embodiments, the angle of the bracket may be altered about the hinge while maintaining all the features and constraints illustrated in FIG. 5.

Figure 9:
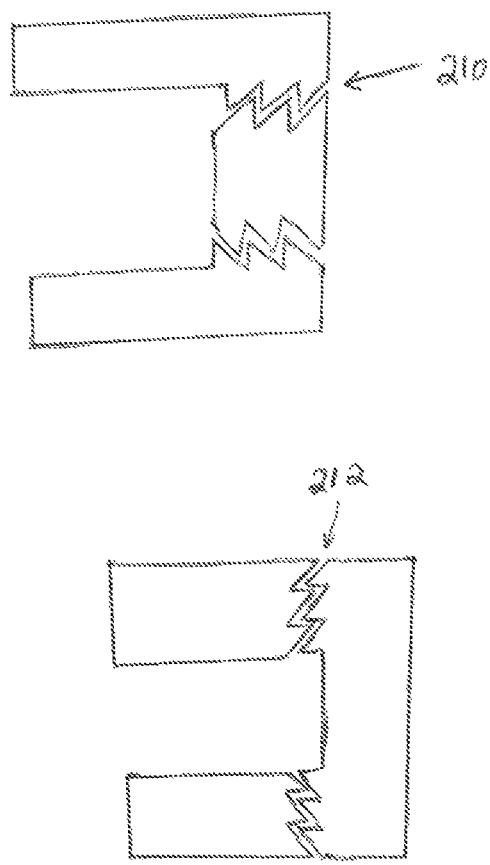
FIG. 9 illustrates an embodiment of a bracket wherein snaps are utilized to alter vertical and horizontal sizing.

FIG. 9 illustrates an embodiment wherein snaps are utilized to obtain horizontal and vertical sizing. In one embodiment horizontal teeth 210, ratchet inward until the correct width is obtained. In another embodiment vertical teeth 212 ratchet inward until the correct thickness is obtained. These teeth are disposed through the outer surfaces of the lower section or upper section. These features can simultaneously exist on the same bracket. In other embodiments the adjusting features can differ from a snap.

Many alternate embodiments have been illustrated. The emphasis thus far has been on holding auxiliary displays onto laptops however these brackets can hold much more than displays, a few examples include: holding papers, pamphlets, books, etc. Also, these brackets work perfectly well in stationary applications.

While the invention has been described and illustrated with reference to certain particular embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. An auxiliary bracket comprising:
   a lower section, the lower section comprising:
   a laptop shelf, the laptop shelf extending from an opening defined by a lower front wall inner surface, wherein the lower front wall inner surface is continuous along the length of the lower section;
   a lower rear wall inner surface, where in the lower rear wall inner surface is continuous along the length of the lower section, and
   two lower side wall inner surfaces, wherein the two lower side wall inner surfaces are continuous along the length of the lower section; and
   a lower wall outer surface, wherein the lower wall outer surface is continuous along the length of the lower section; and
   an upper section, the upper section comprising:
   an auxiliary shelf, the auxiliary shelf extending from an opening defined by an upper front wall inner surface, wherein the upper front wall inner surface is continuous along the length of the upper section;
   an upper rear wall inner surface, wherein the rear wall inner surface is continuous along the length of the upper section;
   and two upper side wall inner surfaces, wherein the two upper side wall inner surfaces are continuous along the length of the upper section; and
   an upper wall outer surface, wherein the upper wall outer surface is continuous along the length of the upper section
   an opening disposed between the upper section and the lower section,
   further, the upper section is disposed at an angle of fifteen degrees relative to the lower section.

2. The auxiliary bracket of claim 1 wherein a hinge is disposed between the upper section and lower section.

3. The auxiliary bracket of claim 1 further comprising:
   a lower sliding feature; and
   an upper sliding feature.

4. The auxiliary bracket of claim 1 further comprising:
a hinge disposed between the upper section and lower section;
an upper sliding feature; and
a lower sliding feature.

5. The auxiliary bracket of claim 1 further comprising horizontal teeth disposed through the lower section.

6. The auxiliary bracket of claim 1 further comprising vertical teeth disposed through the lower section.

7. The auxiliary bracket of claim 1 further comprising horizontal teeth disposed through the upper section.

8. The auxiliary bracket of claim 1 further comprising vertical teeth disposed through the upper section.

9. An auxiliary bracket system comprising:
Two brackets, each bracket comprising:
a lower section, the lower section comprising:
  a laptop shelf, the laptop shelf extending from an opening defined by a lower front wall inner surface, wherein the lower front wall inner surface is continuous along the length of the lower section;
  a lower rear wall inner surface, wherein the lower rear wall inner surface is continuous along the length of the lower section, and
  two lower side wall inner surfaces, wherein the two lower side wall inner surfaces are continuous along the length of the lower section; and
  a lower wall outer surface, wherein the lower wall outer surface is continuous along the length of the lower section; and
an upper section, the upper section comprising:
  an auxiliary shelf, the auxiliary shelf extending from an opening defined by an upper front wall inner surface, wherein the upper front wall inner surface is continuous along the length of the upper section;
  an upper rear wall inner surface, wherein the rear wall inner surface is continuous along the length of the upper section;
  and two upper side wall inner surfaces, wherein the two upper side wall inner surfaces are continuous along the length of the upper section; and
  an upper wall outer surface, wherein the upper wall outer surface is continuous along the length of the upper section
an opening disposed between the upper section and lower section; and
a tension member, the tension member secured to each bracket through the opening between the upper section and lower section, and secured with a stop,
wherein the upper section of each bracket is disposed at an angle of fifteen degrees relative to the lower section of each bracket.

10. The auxiliary bracket system of claim 9 wherein a hinge is disposed between the upper section and the lower section of each bracket.

11. The auxiliary bracket system of claim 9 wherein each bracket further comprises:
a lower sliding feature; and
an upper sliding feature.

12. The auxiliary bracket system of claim 9 wherein each bracket further comprises:
a hinge disposed between the upper section and the lower section;
an upper sliding feature; and
a lower sliding feature.

13. The auxiliary bracket system of claim 9 wherein one or more brackets further comprise horizontal teeth disposed through the lower section.

14. The auxiliary bracket system of claim 9 wherein one or more brackets further comprise vertical teeth disposed through the lower section.

15. The auxiliary bracket system of claim 9 wherein one or more brackets further comprises horizontal teeth disposed through the upper section.

16. The auxiliary bracket system of claim 9 wherein one or more brackets further comprises vertical teeth disposed through the upper section.

\* \* \* \* \*